United States Patent [19]

Pich et al.

[11] Patent Number: 5,563,021

[45] Date of Patent: Oct. 8, 1996

[54] PHOTOGRAPHIC ELEMENTS WITH TETRA-NUCLEAR MEROCYANINE SENSITIZERS

[75] Inventors: Julia Pich, Rickmansworth Herts; John M. Higgins, Middlesex, both of England; John D. Mee, Rochester, N.Y.

[73] Assignee: Eastman Kodak Company, Rochester, N.Y.

[21] Appl. No.: 479,581

[22] Filed: Jun. 7, 1995

Related U.S. Application Data

[63] Continuation-in-part of Ser. No. 414,455, Mar. 31, 1995, abandoned.

[51] Int. Cl.$^6$ .................. G03C 1/08; G03C 1/22
[52] U.S. Cl. .......... 430/264; 430/373; 430/375; 430/592; 430/598
[58] Field of Search .................. 430/264, 373, 430/375, 592, 598

[56] References Cited

U.S. PATENT DOCUMENTS

| | | | |
|---|---|---|---|
| 2,395,879 | 3/1946 | Kendall et al. | 260/240 |
| 2,575,018 | 11/1951 | Keyes et al. | 260/240 |
| 3,384,486 | 5/1968 | Taber et al. | 96/74 |
| 3,385,707 | 5/1968 | Riester et al. | 96/102 |
| 3,682,640 | 8/1972 | Shiba et al. | 96/99 |
| 3,752,673 | 8/1973 | Depoorter et al. | 96/140 |
| 3,877,937 | 4/1975 | Keller et al. | 96/1.6 |
| 3,912,507 | 10/1975 | Keller et al. | 96/1.5 |
| 3,961,952 | 6/1976 | Sprague | 430/69 |
| 4,030,925 | 6/1977 | Leone et al. | 96/73 |
| 4,031,127 | 6/1977 | Leone et al. | 260/465 |
| 4,278,748 | 7/1981 | Sidhu et al. | 430/212 |
| 4,323,643 | 4/1982 | Mifune et al. | 430/441 |
| 4,552,828 | 11/1985 | Toya et al. | 430/217 |
| 4,885,369 | 12/1989 | Uryu et al. | 548/183 |
| 4,975,354 | 12/1990 | Machonkin et al. | 430/264 |
| 5,116,722 | 5/1992 | Callant et al. | 430/363 |
| 5,405,732 | 4/1995 | Shimizu et al. | 430/264 |

FOREIGN PATENT DOCUMENTS

| | | |
|---|---|---|
| 0427892 | 5/1991 | European Pat. Off. . |
| 0540295 | 5/1993 | European Pat. Off. . |
| 5-224330 | 9/1993 | Japan . |
| 212749 | 2/1968 | U.S.S.R. . |
| 489335 | 7/1938 | United Kingdom . |
| 503478 | 4/1939 | United Kingdom . |
| 666226 | 2/1952 | United Kingdom . |

OTHER PUBLICATIONS

U.S. Patent Application Serial No. 08/304, 055, filed Sep. 12, 1994 by Pich et al.
U.S. Patent Application Serial No. 08/395, 265, filed Feb. 28, 1995 by J. D. Mee.

*Primary Examiner*—Lee C. Wright
*Attorney, Agent, or Firm*—Edith A. Rice

[57] ABSTRACT

A photographic element comprising a light sensitive silver halide emulsion sensitized with a dye of formula (I) and a nucleating agent or amine booster associated with the silver halide emulsion:

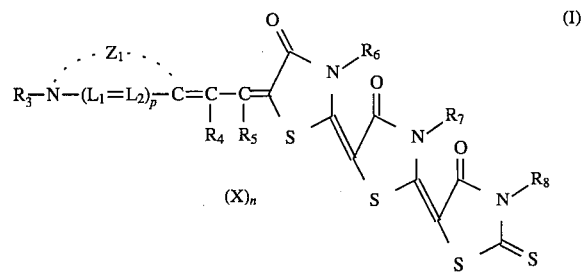

wherein:

$R_3$ is an alkyl group, alkenyl group, or aryl group $R_4$ and $R_5$ are each hydrogen, an alkyl group, alkenyl or aryl group;

$R_6$, $R_7$ and $R_8$ are, independently, an alkyl group, alkenyl group, aryl group, or H;

the dye has at least three acid or acid salt substituents; and each L independently represents a methine group;

p is 0 or 1;

$Z_1$ represents the atoms necessary to complete a 5- or 6-membered heterocyclic ring group;

$(X)_n$ represents counterions as needed to balance the charge on the molecule.

The present invention also provides a process for forming a high contrast photographic image on a photographic element having a light sensitive silver halide emulsion sensitized with a dye of formula (I). The process comprises developing such a photographic element in the presence of a hydrazine compound and an amine booster.

33 Claims, No Drawings

PHOTOGRAPHIC ELEMENTS WITH TETRA-NUCLEAR MEROCYANINE SENSITIZERS

This is a Continuation-In-Part of application Ser. No. 08/414,455, filed Mar. 31, 1995, now abandoned.

FIELD OF THE INVENTION

This invention relates to photographic elements and methods of processing photographic elements, for obtaining high contrast images. Such elements have particular application as lithographic elements used in the field of graphic arts.

BACKGROUND OF THE INVENTION

The procedures for spectrally sensitizing photographic silver halide emulsions so as to extend their sensitivity range are generally well known. In particular, for some Graphic Arts applications it may be necessary to sensitize the silver halide grains to specific wavelengths, for example to light of wavelength 633 nm for helium-neon gas laser (HN) or about 670 nm for laser diode (LD) and red light emitting diodes (LED) devices. There are numerous examples of suitable sensitizing dyes for these purposes, for example, see *The Theory of the Photographic Process*, T. H. James, editor, 4th edition, pages 195–234 for leading references. In British Patent Specification 1,471,701 is described the use of trinuclear cyanine dyes for such purposes.

However, in Graphic Arts applications, sensitizing dyes are also required to provide many other qualities, such as low post-process stain while still providing good speed. Post-process stain is distracting and is therefore considered undesirable. It can in some circumstances cause undesirably high minimum ultraviolet light density. Additionally, photographic elements for graphic arts applications may contain hydrazine nucleating agents and optionally also amine boosters. In such elements or processes, the sensitizing dyes used may adversely affect photographic parameters such as the effective speed of the emulsion or the level of nucleation.

The use of trinuclear merocyanine sensitizing dyes is described in U.S. Pat. No. 5,116,722, EP 0 540 295, U.S. Pat. No. 3,682,640 and USSR Inventor's Certificate No. 212,749. Specific tetranuclear merocyanine dyes for sensitizing photographic emulsions are described in GB 489,335.

However, it would be desirable to provide photographic elements which are processed in the presence of hydrazine nucleators and optionally amine boosters. The emulsions of such elements would be sensitized by dyes which contribute low stain following processing of the element, and which still provide good sensitization while having little or no adverse affect on other parameters such as the effective speed of the emulsion or increased minimum density ("Dmin").

SUMMARY OF THE INVENTION

The present invention provides a photographic element comprising a light sensitive silver halide emulsion sensitized with a dye of formula (I) and a nucleating agent or amine booster associated with the silver halide emulsion:

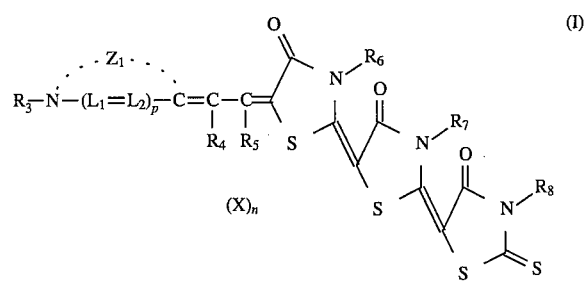

wherein:
$R_3$ is an alkyl group, alkenyl group, or aryl group
$R_4$ and $R_5$ are each hydrogen, an alkyl group, alkenyl or aryl group;
$R_6$, $R_7$ and $R_8$ are, independently, an alkyl group, alkenyl group, aryl group, or H;
the dye has at least three acid or acid salt substituents; and
each L independently represents a methine group;
p is 0 or 1;
$Z_1$ represents the atoms necessary to complete a 5- or 6-membered heterocyclic ring group;
$(X)_n$ represents counterions as needed to balance the charge on the molecule.

The present invention further provides a method of processing elements containing a silver halide emulsion sensitized with a dye of formula (I). The elements may or may not be elements of the present invention. In particular, the method comprises developing the photographic element in the presence of a hydrazine compound and an amine booster. The amine booster may be present in a developing solution or one (or preferably both) of them may be present in the element.

EMBODIMENTS OF THE INVENTION

It will be understood throughout this application that formulae shown for any dyes or precursor compounds of the present invention are to be interpreted as including all stereoisomers where possible. This is particularly true of isomers about a double bond. Thus, considering the following formulae:

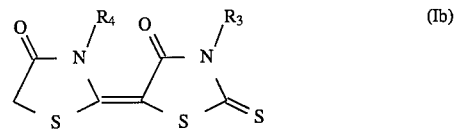

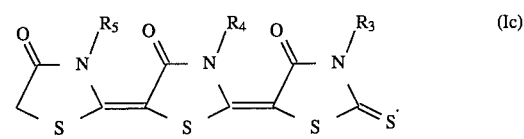

It will be understood that the above formulae, as written, will, for example, respectively include stereoisomers such as structures:

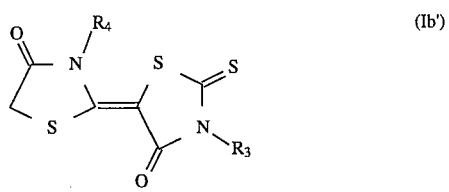

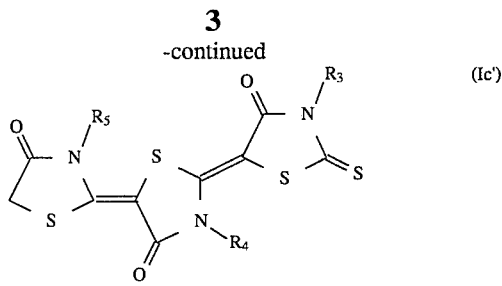

(Ic')

In the present application, by reference to "under", "above", "below", "upper", "lower" or the like terms in relation to layer structure of a photographic element, is meant the relative position in relation to light when the element is exposed in a normal manner. "Above" or "upper" would mean closer to the light source when the element is exposed normally, while "below" or "lower" would mean further from the light source. Since a typical photographic element has the various layers coated on a support, "above" or "upper" would mean further from the support, while "below" or "under" would mean closer to the support. Further, reference to any chemical "group" (such as alkyl group, aryl group, heteroaryl group, and the like) includes the possibility of it being both substituted or unsubstituted (for example, alkyl group and aryl group include substituted and unsubstituted alkyl and substituted and unsubstituted aryl, respectively). Further, where possible, such groups may be branched or unbranched, cyclic or acyclic (for example, alky group includes branched or unbranched alkyl, cyclic or acylic alkyl). Generally, unless otherwise specifically stated, substituent groups usable on molecules herein include any groups, whether substituted or unsubstituted, which do not destroy properties necessary for the photographic utility. It will also be understood throughout this application that reference to a compound of a particular general formula includes those compounds of other more specific formula which specific formula falls within the general formula definition.

As used herein a "nucleating agent" is any compound which provides additional silver development in an imagewise manner to increase the gamma of a photographic element (that is, increase its contrast). Suitable nucleating agents are described in U.S. Pat. Nos. 4,030,925, 4,031,127, 4,278,748, 4,323,643, 4,975,354 and in EP 0 364 166. These patent documents and all other references cited in the present application are incorporated herein by reference. Hydrazine nucleating agents are particularly preferred in the present invention. By "hydrazine nucleating agent" is meant hydrazine or any of its compounds which act as nucleators. The effect of hydrazine compounds is generally described in T. H. James, editor, *The Theory of the Photographic Process*, 4th Edition, Macmillan, New York, 1977, page 420. An "amine booster" is any amine compound which promotes the rate of reaction of the nucleating agent to further increase gamma of the element. The contrast or "gamma" of a photographic element refers to the rate of change of density with exposure and is measured by the slope of the straight line portion of the characteristic curve. The photographic elements of the present invention or elements processed according to the method of the present invention, typically exhibit very high contrast, by which is meant a gamma of greater than 10.

Reference to the nucleating agent or amine booster being "associated" with the silver halide emulsion sensitized by the dye of formula (I), means that they are positioned in the element so that they will have their desired effect on that emulsion (that is, the nulceating agent will increase the gamma which would otherwise be obtained from that emulsion, and the amine booster further increases the gamma). Typically, this will mean that the nucleating agent and/or amine booster (preferably both of them) are in the same layer of a photographic element where the silver halide sensitized by the dye of formula (I) is located. However, this is not essential and the nucleating agent and/or amine booster could, for example, be in a layer adjacent to the layer containing the silver halide sensitized by the dye of formula (I). Either of them (preferably both) can, of course, be present in the photographic element distributed between or among the layer containing the silver halide sensitized by the dye of formula (I) and other layers, such as undercoating layers, interlayers and overcoating layers.

The nulceating agent may particularly be a hydrazine nucleating agent. Any hydrazine compound can be used that functions as a nucleator and is capable of increasing the contrast provided by the silver halide emulsion sensitized by the dye of formula (I), particularly jointly with the amine booster.

Hydrazine compounds may particularly be of formula (II):

wherein $R_{21}$ may be H, an aliphatic group, an alicyclic group, an aromatic group, an alkoxy group, an aryloxy or amino group, $G_1$ represents a —CO— group, a —SO$_2$— group, a —SO— group, a —COCO— group, a thiocarbonyl group, an iminomethylene group or an amino group and $R_{15}$ is a phenyl group preferably having a Hammett sigma para ("$\sigma_p$") value of less than +0.30. Hammett sigma para values, the method of measuring them, and tables listing the values for various substituents, are all well known in organic chemistry. For example, Hammett $\sigma_p$ values are discussed in *Advanced Organic Chemistry* 3rd Ed., J. March, (John Wiley Sons, NY; 1985). Note that the "p" subscript refers to the fact that the $\sigma$ values are measured with the substituents in the para position of a benzene ring. Additional tables relating to Hammett $\sigma_p$ constants can be found in *Chemical Reviews* Volume 91, pages 165–195 (authored by C. Hansch et al.). $R_{15}$ can be a phenyl group which is either electron donating (electropositive; negative $\sigma_p$ value) or electron withdrawing (electronegative; positive $\sigma_p$ value) by virtue of its sustituents. However, phenyl groups which are highly electron withdrawing produce inferior nucleating agents. The electron withdrawing or electron donating characteristic of a specific phenyl nucleus can be assessed by reference to Hammett sigma values.

Preferred substituents for the phenyl group $R_{15}$, are those which are not electron withdrawing. For example, the substituents can be alkyl groups (which includes include straight or branched chain), for example, methyl, ethyl, n-propyl, isopropyl, n-butyl, isobutyl, n-hexyl, n-octyl, tert-octyl, n-decyl, n-dodecyl and the like. The phenyl substituents can further include alkoxy groups wherein the alkyl moieties thereof can be particularly chosen from among the foregoing alkyl groups. The phenyl substituents can also include acylamino groups. Illustrative acylamino groups include acetylamino, propanoylamino, butanoylamino, octanoylamino, benzoylamino, and similar groups.

The nucleating agent may particularly include a ballast group (that is, a group which inhibits the nucleating agent from migrating in the photographic element). Typically, such groups contain at least 8 carbon atoms (for example, 8 to 20 or 10 to 20). In one particularly preferred form the alkyl, alkoxy and/or acylamino substituent on the phenyl of $R_{15}$, are in turn substituted with a conventional photographic ballast, such as the ballasting moieties of incorporated couplers and other immobile photographic emulsion addenda. In such case also, the ballast group typically contains at least eight carbon atoms and can be particularly selected from both aliphatic and aromatic relatively unreactive groups, such as alkyl, alkoxy, phenyl, alkylphenyl, phenoxy, alkylphenoxy and similar groups.

The alkyl and alkoxy groups on the phenyl of $R_{15}$, including ballasting groups, if any, preferably contain from 1 to 20 carbon atoms, and the acylamino groups on the phenyl of $R_{15}$, including ballasting groups, if any, preferably contain from 2 to 21 carbon atoms. Generally, up to about 30 or more carbon atoms in these groups are contemplated in their ballasted form. Methoxyphenyl, tolyl (e.g., p-tolyl and m-tolyl) and ballasted butyramidophenyl groups are specifically preferred.

Examples of the specifically preferred hydrazine compounds are the following:

1-Formyl-2-(4-[2-(2,4-di-tert-pentyl-phenoxy)butyramido]phenyl)hydrazine,

1-Formyl-2-phenylhydrazine,

1-Formyl-2-(4-methoxyphenyl)hydrazine,

1-Formyl-2-(4-chlorophenyl)hydrazine,

1-Formyl-2-(4-fluorophenyl)hydrazine,

1-Formyl-2-(2-chlorophenyl)hydrazine, and

1-Formyl-2-(p-tolyl)hydrazine.

The hydrazine of formula (II) may also comprise an adsorption promoting moiety. Hydrazines of this type contain an unsubstituted or mono-substituted divalent hydrazo moiety and an acyl moiety. The adsorption promoting moiety can be chosen from among those known to promote adsorption of photographic addenda to silver halide surfaces. Typically, such moieties contain a sulphur or nitrogen atom capable of complexing with silver or otherwise exhibiting an affinity for the silver halide grain surface. Examples of preferred adsorption promoting moieties include thioureas, heterocyclic thioamides and triazoles. Exemplary hydrazines containing an adsorption promoting moiety include:

1-[4-(2-formylhydrazino)phenyl]-3-methyl thiourea,

3-[4-(2-formylhydrazino)phenyl-5-(3-methyl-2 -benzoxazolinylidene)rhodanine-6-([4-(2 -formylhydrazino)phenyl]ureylene)-2 -mcthylbenzothiazole, N-(benzotriazole-5-yl)-4-(2-formylhydrazino)phenylacetamide, N-(benzotriazol-5-yl)-3-(5-formylhydrazino-2 -methoxyphenyl)propionamide, and N-2-(5,5-dimthyl-2-thiomidazol-4-yl-idenimino)ethyl-3-[5-(formylhydrazino)-2 -methoxyphenyl]propionamide.

An especially preferred class of hydrazine compound for use in the elements of this invention are sulphonamido-substituted hydrazines having one of the following structural formulae:

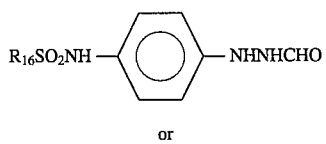

or

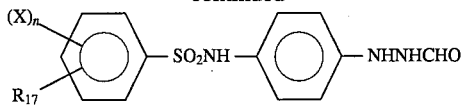

wherein:

$R_{16}$ is alkyl having from 6 to 18 carbon atoms or a heterocyclic ring having 5 or 6 ring atoms, including ring atoms of sulphur or oxygen (particularly 1, 2, 3 or 4 such heteroatoms);

$R_{17}$ is alkyl or alkoxy having from 1 to 12 carbon atoms, or a heterocyclic group such as thienyl or furyl, which group may be substituted with alkyl having from 1 to 4 carbon atoms or with halogen atoms, such as chlorine;

X is alkyl, thioalkyl or alkoxy having from 1 to 5 carbon atoms; halogen; or —$NHCOR_{18}$, —$NHSO_2R_{18}$, —$CONR_{18}R_{19}$ or —$SO_2R_{18}R_{19}$ where $R_{18}$ and $R_{19}$, which can be the same or different, are hydrogen or alkyl having from 1 to 4 carbon atoms; and n is 0, 1 or 2.

Alkyl groups represented by $R_{17}$ can be straight or branched chain and can be substituted or unsubstituted. Substituents include alkoxy having from 1 to 4 carbon atoms, halogen atoms (e.g. chlorine and fluorine), or —$NHCOR_{18}$ or —$NHSO_2R_{18}$—where $R_{18}$ is defined as above. Preferred $R_{17}$ alkyl groups contain from 8 to 16 carbon atoms since alkyl groups of this size impart a greater degree of insolubility to the hydrazine nucleating agents and thereby reduce the tendency of these agents to be leached during development from the layers in which they are coated into the developer solutions.

Alkyl, thioalkyl and alkoxy groups which are represented by X contain from 1 to 5 carbon atoms and can be straight or branched chain. When X is halogen, it may be chlorine, fluorine, bromine or iodide. Where more than one X is present, such substituents can be the same or different.

Particularly preferred nucleators have the following formulae:

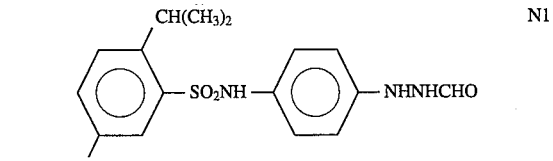

N1

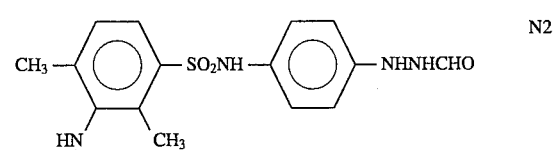

N2

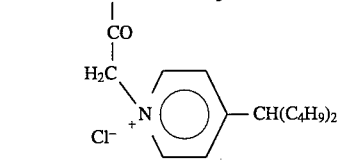

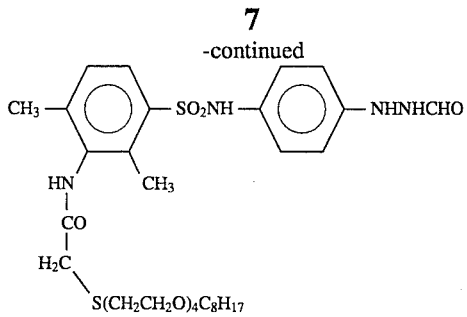

N3

The hydrazine nucleator may be present in amounts of from 40 to 500, preferably 60 to 350, and particularly from 90 to 270 mg per mole of silver halide (particularly that silver halide sensitized by the dye of formula (I)) in the emulsion.

The preferred hydrazine nucleating agents and preferred amine boosters to be used in the present invention are those described in European Specification U.S. Pat. No. 4,975,354, incorporated herein by reference. In the foregoing reference, an amine booster is defined as an amino compound which:

(1) comprises at least one secondary or tertiary amino group, (2) contains within its structure a group comprised of at least three repeating ethyleneoxy units, and (3) has an n-octanol/water partition coefficient ("log P") of at least one, preferably at least three, and most preferably at least four. Log P is defined by the formula:

$$\log P = \log \frac{[X]_{octanol}}{[X]_{water}}$$

wherein [X] is the concentration of the amino compound.

Included within this scope of the amine booster compounds utilized in this invention are monoamines, diamines and polyamines. The amines can be aliphatic amines or they can include aromatic or heterocyclic groups. Preferably, the amine compounds employed in this invention as "incorporated boosters" (that is, they are present in the photographic element) are compounds of at least 20 carbon atoms. It is also preferred that the ethyleneoxy units are directly attached to the nitrogen atom of a tertiary amino group.

Preferred amine compounds for the purposes of this invention are bis-tertiary-amines which have a partition coefficient of at least three and a structure represented by the formula:

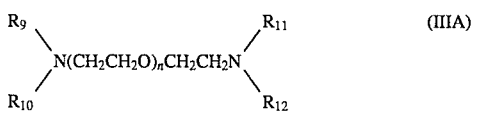

(IIIA)

wherein:

n is an integer with a value of 3 to 50, and more preferably 10 to 50;

$R_9$, $R_{10}$, $R_{11}$ and $R_{12}$ are, independantly, alkyl groups of 1 to 8 carbon atoms, or $R_9$ and $R_{10}$ taken together, and/or $R_{11}$ and $R_{12}$ taken together, may together with the N to which they are appended, represent the atoms necessary to complete a heterocyclic group.

Another preferred group of amino compounds are bis-secondary amines which have a partition coefficient of at least three and a structure represented by the formula:

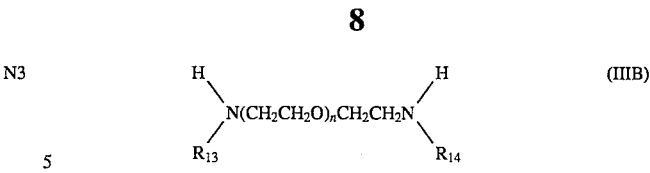

wherein:

n is an integer with a value of 3 to 50, and more preferably 10 to 50; and each $R_{13}$ and $R_{14}$ is, independently, an alkyl group (which of course includes substituted or unsubstituted alkyl, branched or unbranched, cyclic or acyclic) of at least 4 carbon atoms.

The amine booster may be present in amounts of from 1 to 25, preferably 1 to 10, and particularly from 1 to 3 g per mole of silver halide in the emulsion.

As to the dye of formula (I), such dyes are described in detail in U.S. Patent Application by Mee et al., entitled "PHOTOGRAPHIC ELEMENTS WITH PARTICULAR SENSITIZED SILVER HALIDE EMULSIONS" filed by Express Mail on the same date as the present application (Attorney Docket No. 70829GMS), while their preferred method of preparation is described in detail in U.S. patent application by Mee filed by Express Mail on Feb. 28, 1995, and entitled "METHOD OF SYNTHESIZING DYES AND PRECURSOR COMPOUNDS THEREFOR" (Attorney Docket No. 69380GMS).

In particular, with regard to dyes of formula (I), $Z_1$ may particularly represent the atoms which complete an oxazole group, benzoxazole group, naphthoxazole group, thiazole group, benzthiazole group, naphthothiazole group, imidazole group, benzimidazole group, naphthimidazole group, pyridine group, quinoline group, 1,3,4-thiadiazole group, thiazoline group, selenazole group, benzoselenazole group, naphthoselenazole group, benzotellurazole group, or naphthotellurazole group.

Dyes of formula (I) preferably have at least $R_6$, $R_7$ and $R_8$ with an acid or acid salt substituent (with preferably one such substituent on each of $R_6$, $R_7$ and $R_8$). Furthermore, dyes of formula (I) may particularly have at least 4 acid or acid salt substituents (which includes the possibility of 5, 6 or more such substituents). Preferably at least three, and most preferably all four, of $R_3$, $R_6$, $R_7$ and $R_8$ have an acid or acid salt substituent (with each of them preferably having only one such substituent). However, the acid or acid salt substituents need not necessarily be located on the specified groups. For example, $R_3$, $R_4$ and/or $R_5$ could have one or more acid or acid salt substituents.

Preferably, the dye of formula (I) is of structure (Ia) below:

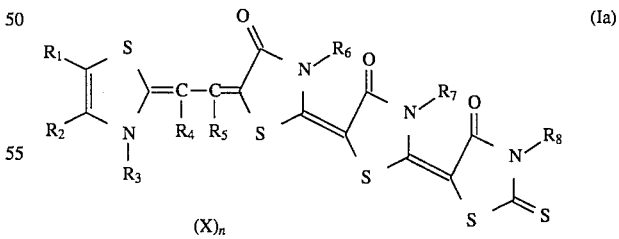

In the above formula (Ia), $R_1$ and $R_2$ independently represent an alkyl group (for example, methyl, ethyl, propyl, butyl), an alkenyl group, an alkoxy group (for example, methoxy, ethoxy, propyloxy, butoxy), an alkylthio group (for example, methylthio, ethylthio, propylthio, butylthio), an acyl group, an acyloxy group, an alkoxycarbonyl group, an alkylsulfonyl group, a carbamoyl group, or a sulfamoyl group. Additionally, $R_1$ and $R_2$ can independently represent an aryl group (such as phenyl) or an arylthio group. $R_1$ and $R_2$ can further independently represent a heteroaromatic group, hydrogen, hydroxy, halogen, carboxy, or cyano, or $R_1$ and $R_2$ together represent the atoms necessary to complete an annellated benzene, naphthalene or anthracene group (it will be understood that in any case where these are substituted, such "substituents" do not include another annellated aromatic ring, that is a benzene group does not include naphthalene).

In any of the above formulae, $R_3$, $R_6$, $R_7$ and $R_8$ may particularly independently be, a 1 to 5 carbon atom alkyl group. $R_4$ and $R_5$ may particularly independently be, a 1 to 5 carbon atom alkyl group or a hydrogen (preferably $R_4$ is hydrogen and $R_5$ is hydrogen or unsubstituted alkyl such as methyl or ethyl). As to the counterions $(X)_n$, X represents the counterion while n is 0 or a positive integer (for example, n is 1 to 4, or even to 5 or 6) depending on the charge of the counterion X and the number of them needed to balance the charge on the molecule. X, if required to be present to balance the charge, is preferably a substituted or unsubstituted ammonium ion or an alkali metal ion (for example, $Na^+$ or $K^+$). However, if the dye does not carry any acid salt groups (that is, any acid groups are present as the free acid form) then no counterions may be necessary.

The following discussion on various groups relates particularly to dyes of formula (I), although it also relates to compounds of formula (II) or (IIIA) or (IIIB) except where indicated to the contrary above (either explicitly or by implication, for example if a group was stated above as preferably having 10 to 20 carbon atoms, then that limitation applies, not the limitations suggested below).

All heterocyclic and aromatic groups (which includes aryl and arylthio) described above, may particularly have from 6 to 20, or from 6 to 15, carbon atoms. All heteroaryl groups may particularly have from 4 to 7 (or 5 or 6) carbon atoms, with 1, 2, 3 or 4 heteroatoms selected from O, N, S or Si. Examples of aromatic groups include phenyl, tolyl, and the like, any of which may be substituted or unsubstituted. Examples of heteroaryl include thienyl, pyrrazolo, and furyl.

All alkyl, alkoxy, alkenyl, alkylthio, acyl, acyloxy, alkoxycarbonyl, alkylsulfonyl, carbamoyl, or sulfamoyl groups described herein, may particularly have from 1 to 20 carbon atoms (or 1 to 10 or 1 to 8 carbon atoms; or even 1, 2, 3 or 4 carbon atoms). All of these groups may be linear, branched or cyclic. Examples of alkyl include methyl, ethyl, propyl, and the like, and substituted alkyl groups (preferably a substituted lower alkyl containing from 1 to 8 carbon atoms) such as hydroxyalkyl group (for example, 2-hydroxyethyl), a sulfoalkyl group, (for example, 4-sulfobutyl, 3-sulfopropyl) and the like.

As to the acid or acid salt groups described above, such groups include carboxy, sulfo, phosphato, phosphono, sulfonamido, sulfamoyl, or acylsulfonamido (for example, $-CH_2-CO-NH-SO_2-CH_3$). Note that the foregoing words are used to define only the free acid groups or their corresponding salts, and do not include esters where there is no ionizable or ionized proton. Particularly preferred are the carboxy and sulfo groups (for example, 3-sulfobutyl, 4-sulfobutyl, 3-sulfopropyl, 2-sulfoethyl, carboxymethyl, carboxyethyl, carboxypropyl and the like).

Substituents on any of the specified substituent groups defined above, can include halogen (for example, chloro, fluoro, bromo), alkoxy (particularly 1 to 10 carbon atoms; for example, methoxy, ethoxy), substituted or unsubstituted alkyl (particularly of 1 to 10 carbon atoms, for example, methyl, trifluoromethyl), amido or carbamoyl (particularly of 1 to 10 or 1 to 6 carbon atoms), alkoxycarbonyl (particularly of 1 to 10 or 1 to 6 carbon atoms), and other known substituents, and substituted and unsubstituted aryl ((particularly of 1 to 10 or 1 to 6 carbon atoms) for example, phenyl, 5-chlorophenyl), thioalkyl (for example, methylthio or ethylthio), hydroxy or alkenyl (particularly of 1 to 10 or 1 to 6 carbon atoms) and others known in the art. Additionally, any of the substituents may optionally be non-aromatic.

Dyes of formula (I) particularly provide on the light sensitive silver halide emulsion, a wavelength of maximum sensitivity ("λmax") which is between about 550 nm to 750 nm, but preferably between 600 to 690 nm (most preferably 620 to 680 nm).

Dyes of the type of formula (I) can be synthesized by using the usual method for the synthesis of complex trinuclear merocyanines. That is, trinuclear merocyanine dyes are known to be prepared by S-alkylation of the corresponding merocyanine, followed by displacement of the alkylthio group in the alkylated dye by a rhodanine, as shown in the following scheme.

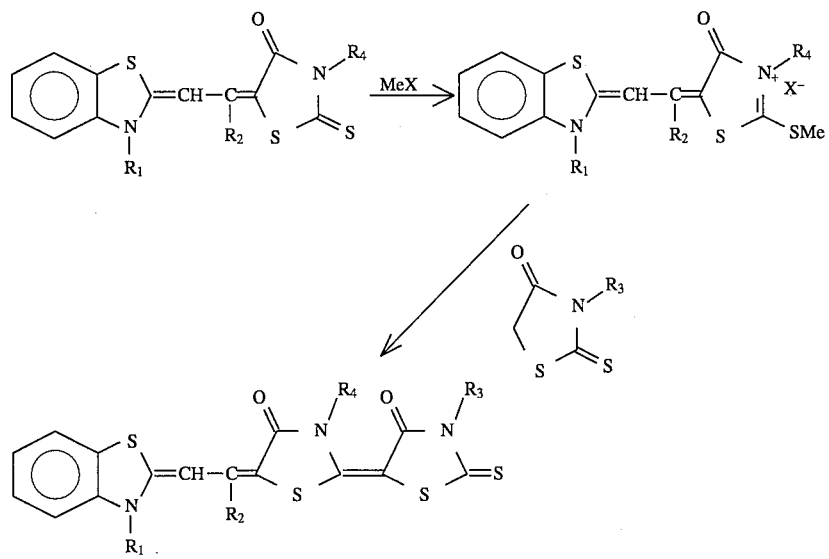

Tetra-nuclear merocyanines are described in UK 489,335 and were synthesized in a manner analogous to that described above for tri-nuclear merocyanines, by using a tri-nuclear merocyanine as starting material. The tetra-nuclear merocyanine dyes of formula (I) can be prepared in a similar manner. However, such a method often gives poor yields and is inconvenient, in that a merocyanine dye must first be synthesized as the starting material for the synthesis. Therefore, it is preferred to prepare dyes of formula (I) using the method described in detail in U.S. patent application by Mee filed by Express Mail on Feb. 28, 1995, and entitled "METHOD OF SYNTHESIZING DYES AND PRECURSOR COMPOUNDS THEREFOR" (Attorney Docket No. 69380GMS). The foregoing patent application and all other references cited in the present application, are incorporated herein by reference.

In particular, dyes of formula (I) are preferably prepared by the following reacting scheme:

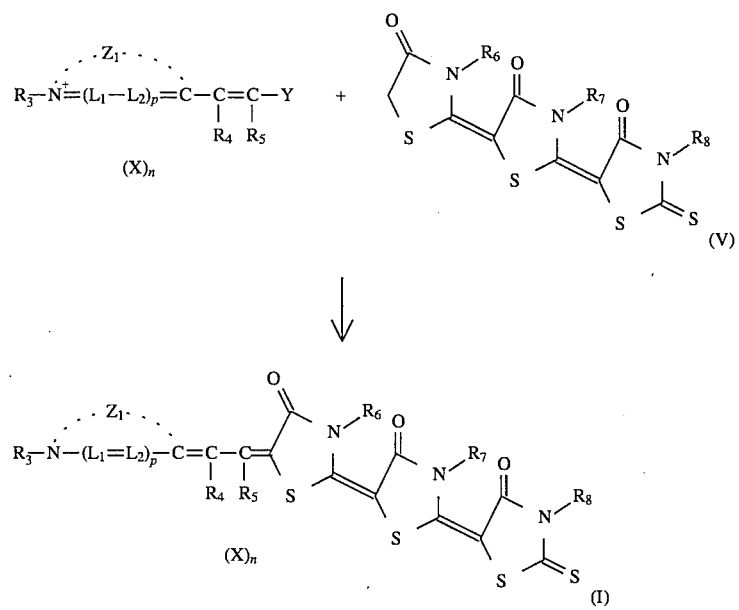

wherein: $Z_1$, X, n, and each of $R_3$ through $R_8$ are as defined above in connection with formula (I), and Y is a leaving group. Examples of Y include an alkoxy or alkylthio (either particularly of 1 to 20, 1 to 10, or 1 to 6 carbon atoms), acetanilido or arylthio group (either particularly of 6 to 20, or 6 to 12 carbon atoms), or halogen (particularly chloro).

To produce low-staining dyes, including complex merocyanine sensitizing dyes, it is often desirable to provide the dye with one or more water solubilizing groups. Particularly useful as water solubilizing groups are carboxyalkyl and/or sulfoalkyl substituents. Any compounds of formulae (I) (including formula (Ia)) advantageously synthesized with the carboxyl function protected as an ester. It is convenient to cleave the ester to a carboxylic acid, or a salt thereof, either before or after dye formation. This is preferably done by acid hydrolysis (since basic hydrolysis tends to induce decomposition of intermediates or dyes). The hydrolysis can be carried out typically between about 20° C. to about 100° C. The optimum time and temperature for hydrolysis of each compound may vary (the optimum conditions being the best compromise between rapid hydrolysis and minimum decomposition). The acid may for example be aqueous HCl (for example, 20–30% by weight of HCl). In some cases the dye or intermediate may be insufficiently soluble in this medium and a co-solvent may be required. Trifluoracetic acid has been found to be particularly useful as a co-solvent.

Starting compounds of formula (V) in the above scheme are prepared by using a cyclic ketomethylene as the starting material. In general, the method used can be represented as a method of synthesizing a compound of formula (VIa):

wherein $R_7$ is defined above in connection with the dye of formula (I), and G represents a ketomethylene group as shown below:

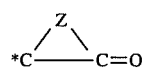

where * is the point of attachment of G as shown in formula (Ia), and Z represents the atoms necessary to complete a substituted or unsubstituted 4 to 7-membered (preferably 5 or 6) alicyclic or heterocyclic ring. In complete a substituted or unsubstituted 4 to 7-membered (preferably 5 or 6) alicyclic or heterocyclic ring. In particular, in synthesizing compound (V), Z will represent the rhodanine ring of formula (V) which carries the $R_8$ substituent on the nitrogen. The method in such case comprises reacting

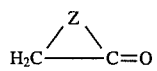

with an isothiocyanate of formula (VII) in the presence of a base to obtain a compound of formula (VIII):

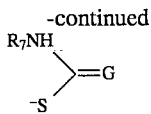

(VIII)

Compound (VIII) is then reacted with a haloacetic acid or a haloacetic ester of formula $XCH_2CO_2R_{26}$, wherein X is a halogen and $R_{26}$ is H, alkyl group or aryl group, to obtain compound (IX):

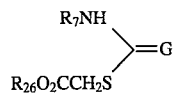

(IX)

and then $HOR_{26}$ is eliminated to form compound (VIa).

It will be seen that using the resulting product, the process can again be repeated to add another ring to obtain the compound of formula (V). In particular, a 1,3-thiazolidin-4-one ring can be added to such starting ketomethylene reagent which already has two rings.

Suitable bases for carrying out the reaction of the ketomethylene or malononitrile with the isothiocyanate, are any base which is sufficiently strong to remove a proton from their methylene group, which then facilitates the attack of the carbon of the isothiocyanate group. Typically, such a base will have a pKa of at least 10, more preferably 12 (and most preferably 13). Preferred bases are organic bases such as amidine compounds, such as 1,8-diazabicyclo[5.4.0] undec-7-ene ("DBU"), 1,5-diazabicyclo[4.3.0] non-5-ene ("DBN"), or 1,1,3,3,-tetramethylguanidine.

The step in which the water or alcohol is eliminated to form the 1,3-thiazolidin-4-one ring, may occur spontaneously or not depending upon the exact compound being sythesized. In the case where elimination and ring closure does not occur spontaneously or sufficiently fast, this can be aided by heating above room temperature (that is, heating above 20° C., preferably up to about 100° C. or about 120° C., or even higher provided no decomposition of reagents or product occurs), as well as with the presence of an acid (for example, a sulfonic acid such as p-toluene sulfonic acid). All steps of the present method may be performed in any suitable solvent. Preferably, the solvent is an aprotic, polar solvent which of course, is itself substantially inert to any of the reactants particularly the isothiocyanate. Examples of suitable solvents include acetonitrile or other alkylnitrile solvents, N,N-dimethylformamide, N,N-dimethylacetamide and dimethylsulfoxide. In some cases an alcohol solvent (which is a protic solvent) may be suitable. However, an aprotic solvent is not necessary for the final step involving elimination of alcohol or water. For this final step, sometimes no solvent may be necessary, or a solvent such as acetic acid may be suitable.

Examples of dyes of formula (I) are provided below:

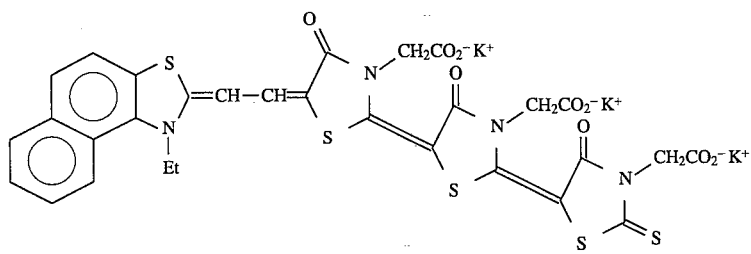

DYE 1

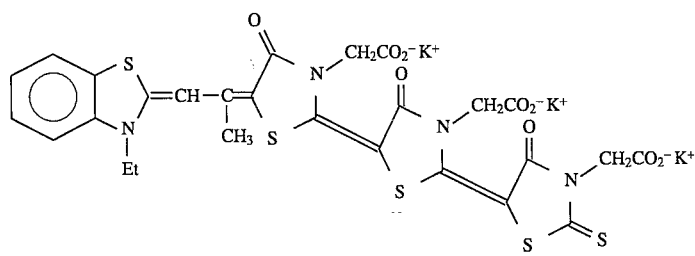

DYE 2

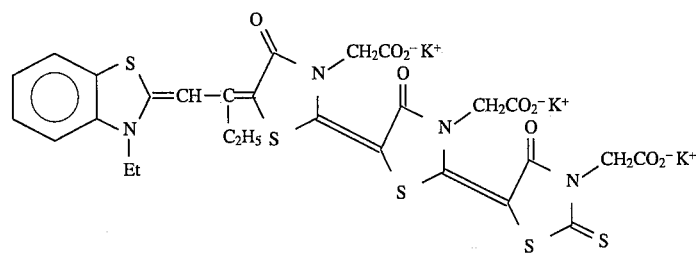

DYE 3

-continued

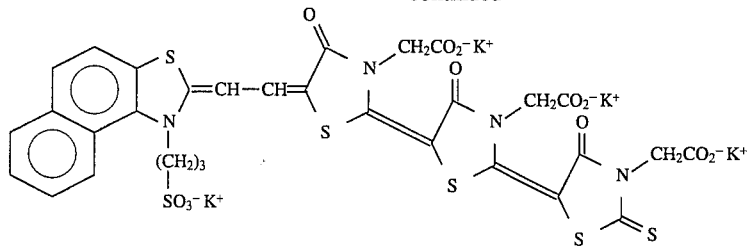

DYE 4

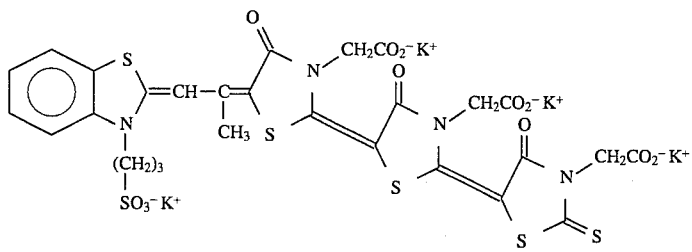

DYE 5

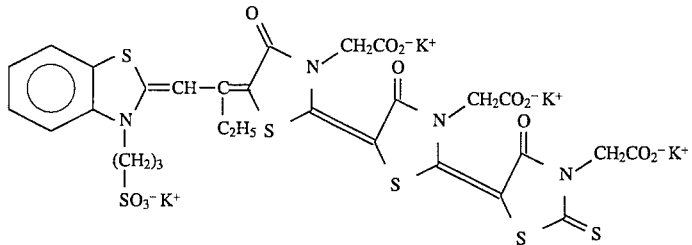

DYE 6

Dyes of formula (I) may be incorporated into the silver halide emulsion as a solution in water or an alcohol in a known manner. The dye may be incorporated into the present materials in amounts from 5 to 500, preferably from 50 to 350, more preferably from 100 to 300 mg of dye per mole of silver halide in the emulsion layer.

Photographic elements of the present invention will typically have at least one light sensitive silver halide emulsion layer and a support. They are preferably black and white elements for use in Graphic Arts applications. The photosensitive materials described in the examples below were coated in 3 layers, namely a gel underlayer, the photosensitive emulsion layer and an overcoat layer. However, alternative coating formats may be employed. For example, a gel interlayer may be coated between the emulsion and overcoat and/or there is no layer between the support and the emulsion layer.

Photographic elements of the present invention can also contain additional layers, such as filter layers, interlayers, overcoat layers, subbing layers, and the like. All of the layers of photographic elements of the present invention, can be coated on a support which can be transparent or reflective (for example, a paper support). For paper materials, it is customary to employ a fluorescent brightening agent. These may be incorporated into the materials by known techniques, for example by dissolving a water-soluble brightener in the gelatin supercoat (the layer most remote from the support). In one embodiment a water-insoluble brightener may be used. It may be imbibed onto particles of a polymer dispersion as described in British Patent Specifications 1,504,949 or 1,504,950, or dissolved in droplets of coupler solvents prior to incorporation in a layer of the material (for example, in the overcoat).

Photographic elements of the present invention may also usefully include a magnetic recording material as described in Research Disclosure, Item 34390, November 1992, or a transparent magnetic recording layer such as a layer containing magnetic particles on the underside of a transparent support as in U.S. Pat. Nos. 4,279,945 and 4,302,523. The element typically will have a total thickness (excluding the support) of from 5 to 30 microns.

In the following discussion of suitable materials for use in photographic elements, reference will be made to Research Disclosure, September 1994, Number 365, Item 36544, published by Kenneth Mason Publications, Ltd., Dudley Annex, 12a North Street, Emsworth, Hampshire P010 7DQ, ENGLAND, which will be identified hereafter by the term "Research Disclosure I." The Sections hereafter referred to are Sections of the Research Disclosure I.

The silver halide emulsions employed in the photographic elements may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

Supports for the photographic elements can be transparent or reflective (for example, a paper support). Such supports include polymeric films such as cellulose esters (for example, cellulose triacetate and diacetate) and polyesters of dibasic aromatic carboxylic acids with divalent alcohols (for example, poly(ethylene-terephthalate), poly(ethylenenapthalates)), paper and polymer coated paper. Such supports are described in further detail in *Research Disclosure I*, Section XV. The preferred support for Graphic Arts elements is polyethylene terephthalate with a conventional Graphic Arts anti-halation backcoat (that is, on the side of the support opposite the side upon which the light sensitive silver halide is provided) designed to absorb light of the appropriate wavelength.

The photographic elements may also contain materials that accelerate or otherwise modify the processing steps of bleaching or fixing to improve the quality of the image. Bleach accelerators described in EP 193,389; EP 301,477; U.S. Pat. Nos. 4,163,669; 4,865,956; and 4,923,784 are particularly useful. Also contemplated is the use of development accelerators or their precursors (UK Patent 2,097, 140; U.K. Patent 2,131,188); electron transfer agents (U.S. Pat. Nos. 4,859,578; 4,912,025); antifogging agents such as derivatives of hydroquinones, aminophenols, amines, gallic acid; catechol; ascorbic acid; and sulfonamidophenols.

The elements may also contain filter dye layers comprising colloidal silver sol or yellow and/or magenta filter dyes, either as oil-in-water dispersions, latex dispersions or as solid particle dispersions.

The emulsions and materials to form the photographic elements may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906,559); with ballasted chelating agents such as those in U.S. Pat. No. 4,994,359 to reduce sensitivity to polyvalent cations such as calcium; and with stain reducing compounds such as described in U.S. Pat. Nos. 5,068,171 and 5,096,805.

The silver halide emulsion used for elements of the present invention, and which is sensitized by a dye of formula (I), is preferably of the type that provides a high contrast image as required in Graphic Arts applications. Such emulsions are customarily relatively high in silver chloride and low in silver iodide. They may contain both silver bromide and silver iodide in addition to silver chloride. Preferably the iodide content of these emulsions is less than 10 mole percent. Substantially pure silver chloride emulsions may be used for this purpose, that is emulsions having at least 90% silver chloride or more (for example, at least 95%, 98%, 99% or 100% silver chloride). In such a case the possibility is also contemplated that the silver chloride could be treated with a bromide source to increase its sensitivity, to provide an equivalent bulk bromide level of 2 to 2.5% or between about 0.6 to 1.2%. However, the preferred emulsions comprise at least 50% (most preferably 70%) percent chloride and less than 50% (most preferably 30%) percent bromide. The foregoing percentage figures are in mole percent.

As is known in the Graphic Arts field the grains may be doped with Rhodium, Ruthenium, Iridium or other Group VIII metals, preferably at levels in the range $10^{-9}$ to $10^{-3}$, preferably $10^{-6}$ to $10^{-3}$, mole metal per mole of silver. The preferred Group VIII metal is Rhodium.

The type of silver halide grains preferably include polymorphic, cubic, and octahedral. The grain size of the silver halide may have any distribution known to be useful in photographic compositions, and may be ether polydipersed or monodispersed. The silver halide emulsions employed in the photographic elements may be negative-working, such as surface-sensitive emulsions or unfogged internal latent image forming emulsions, or positive working emulsions of internal latent image forming emulsions (that are either fogged in the element or fogged during processing).

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., ECD/$t^2$)>25 and ECD and t are both measured in micrometers (μm). The tabular grains can be of any thickness compatible with achieving an aim average aspect ratio and/or average tabularity of the tabular grain emulsion. Preferably the tabular grains satisfying projected area requirements are those having thicknesses of <0.3 μm, thin (<0.2 μm) tabular grains being specifically preferred and ultrathin (<0.07 μm) tabular grains being contemplated for maximum tabular grain performance enhancements. When the native blue absorption of iodohalide tabular grains is relied upon for blue speed, thicker tabular grains, typically up to 0.5 μm in thickness, are contemplated.

High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111} major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I*, Section I. B. (3) (page 503).

The silver halide grains may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, ruthenium, rhodium, phosphorous, or combinations thereof. Chemical sensitization is generally carried out at pAg levels of from 5 to 10, pH levels of from 3 to 6, and temperatures of from 30 to 80° C., as described in *Research Disclosure I*, Section IV (pages 510–511) and the references cited therein.

The sensitizing dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye of formula (I) is typically used in a silver halide emulsion (typically in a silver halide emulsion containing layer) in an amount of from 5 to 500 mg per mole of silver halide (preferably from 50 to 350, and more preferably from 100 to 300 mg per mole of silver halide emulsion). The dye/silver halide emulsion may be mixed with a dispersion of color image-forming coupler immediately before coating or in advance of coating (for example, 2 hours).

The photographic elements can be imagewise exposed using any of the known techniques for graphic arts films. Such exposure may include exposure to radiation having a wavelength of from about 550–750 nm, preferably between about 600–690 nm. Exposure may be to a real image through a lens. However, exposure may be by exposure to a computer stored or generated image by means of light emitting devices (such as light controlled by light valves, CRT and the like).

The photographic elements can be processed by any known process. Processing is described in *Research Disclosure I*, Sections XIX and XX, or in T. H. James, editor, *The Theory of the Photographic Process*, 4th Edition, Macmillan, New York, 1977.

In the case of preferred Graphic Arts films, the light sensitive silver halide contained in the photographic elements is preferably processed following exposure to form a visible image, by associating the silver halide with an alkaline medium in the presence of a developing agent contained in the medium or in the element. When the photographic elements contain incorporated developing agents, the elements can be processed in the presence of an activator.

The present invention, as already described, provides that the hydrazine nucleator and/or amine booster, can be provided in a processing solution (particularly the developer) rather than being incorporated into the element. However, it is preferred that both the nucleating agent and amine booster be incorporated in the element. In either case, it will be appreciated that the element is developed in the presence of the nucleating agent and the amine booster.

Very high contrast images can be obtained in Graphic Arts films by processing at pH values in the range 11 to 12.3, but preferably lower pH values, for example below 11 and most preferably in the range 10.3 to 10.5 are employed for processing the photographic recording materials as described herein.

The developers for the preferred Graphic Arts films are typically aqueous solutions, although organic solvents, such as diethylene glycol, can also be included to facilitate the solvency of organic components. The developers contain one or a combination of conventional developing agents, such as polyhydroxybenzene, aminophenol, para-phenylenediamine, ascorbic acid, pyrazolidone, pyrazolone, pyrimidime, dithionite, hydroxylamine, or other conventional developing agents.

It is preferred when processing the preferred Graphic Arts films constructed according to the present invention, to use hydroquinone and 3-pyrazolidone developing agents in combination. The pH of the developers can be adjusted with alkali metal hydroxides and carbonates, borax and other basic salts. To reduce gelatin swelling during development, compounds such as sodium sulfate can be incorporated into the developer. Also, compounds such as sodium thiocyanate can be present to reduce granularity. Chelating and sequestering agents, such as ethylenediaminetetraacetic acid or its sodium salt, can be present. Generally, any conventional developer composition suitable for Graphic Arts films, can be employed in the processing the preferred Graphic Arts films of this invention. Specific illustrative photographic developers are disclosed in the *Handbook of Chemistry and Physics*, 36th Edition, under the title "Photographic Formulae" at page 3001 et seq. and in *Processing Chemicals and Formulae*, 6th Edition, published by Eastman Kodak Company (1963). Graphic Arts elements can, of course, be processed with conventional developers for lithographic photographic elements, as illustrated by U.S. Pat. No. 3,573,914 and UK Patent No. 376,600.

Further details on the construction and processing of Graphic Arts elements of the present type, can be found in U.S. Pat. No. 4,975,354. However, as already described, elements of the present invention must have a light sensitive silver halide emulsion sensitized by a dye of formula (I).

The method of the present invention will be further described in the examples below.

EXAMPLE 1

The photosensitive materials used in this example consist of a gel underlayer, a light sensitive layer and a gel overcoat; coated on a polyethylene terephthalate base with an antihalation back coat designed to absorb red light.

The light sensitive layer consists of a 70:30 chlorobromide cubic monodispersed emulsion (0.18μ edge length) doped with ammonium hexachlororhodate and coated at 3.3 g/m². Other addenda included in the light sensitive layer are the sensitizing dye, 2-methylmercapto-5-carboxy-6-methyl tetraazaindene, 1-(3-acetamidophenyl)-5-mercaptotetrazole, 4-carboxy-methyl-4-thiazoline-2-thione and a latex copolymer of methyl acrylate, 2-acrylamido-2-methylpropanesulfonic acid and the sodium salt of 2-acetoxymethylmethyacrylate (88:5:7 by weight), 3,5-disulfocatechol, disodium salt and hydroquinone.

The underlayer consists of gel at 1.0 g/m² with a latex copolymer of methyl acrylate, 2-acrylamido-2-methylpropanesulfonic acid and the sodium salt of 2-acetoxymethylmethyacrylate (88:5:7 by weight). Other addenda which may be coated in the underlayer include the hydrazine nucleator N3 at 6 mg/m² and the following incorporated booster at 61 mg/m².

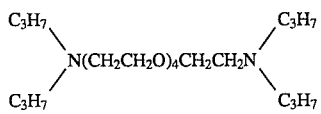

The overcoat consists of gel at 0.5 g/m², with surface active chemicals to aid coating, plus matting beads and colloidal silica to aid film handling. The layers are hardened with bis-vinylsulfonylmethyl ether at 3.5% of the total gel.

Structure of the sensitizing dyes tested are given above. Additionally, the structure of the comparative dye, "REF 1" is:

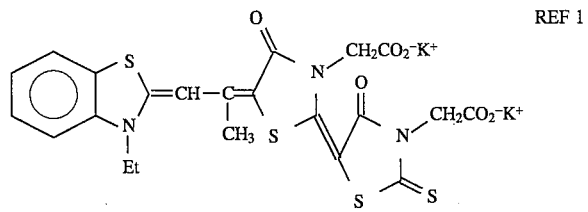

The elements were exposed for $10^{-6}$ seconds using a solid state laser diode, having a maximum intensity at 670 nm, to produce a 21 step, 0–2 logE (0.08 logE) step wedge. The coatings were processed for 30 seconds in Kodak RA2000 developer (1+2), fixed for 30 seconds in Kodak 3000 Fixer (1+3), washed and then dried. The densities of the step wedge silver images so produced were measured and plotted against the appropriate relative exposure level.

Several parameters were derived from the densitometry results but in particular the minimum density, the speeds ("SP0.6" and "SP4") and a calculated practical density (PDP) of the coatings were measured, where SP0.6 is the speed at a density of "fog+0.6", SP4 is the speed at a density of "fog+4" and PDP is the density at (SP0.6+4). These data are shown in Table 1 and 2. In addition, in Table 2 D_SP4 is the change of speed and D_PDP is the change in PDP after accelerated keeping tests. To obtain D_SP4 and D_PDP, unprocessed elements were sealed in foil bags and kept for 7 days in ambient humidity conditions at 49° C. They were then exposed and processed as described earlier and the change in SP4 and PDP from corresponding fresh elements was measured.

TABLE 1

| SAMPLE | DYE | LEVEL* | Dmin | SP0.6 | Stain |
|---|---|---|---|---|---|
| 1 | REF 1 | 18 | 0.022 | 0.67 | PALE PINK |
| 2 | REF 1 | 36 | 0.029 | 1.07 | PINK |
| 3 | DYE 2 | 12 | 0.029 | 0.83 | PALE BLUE |
| 4 | DYE 2 | 24 | 0.037 | 1.08 | BLUE |
| 5 | DYE 2 | 36 | 0.048 | 1.16 | DEEP BLUE |
| 6 | DYE 5 | 11 | 0.025 | 0.81 | NONE |
| 7 | DYE 5 | 21 | 0.030 | 1.07 | NONE |
| 8 | DYE 5 | 32 | 0.035 | 1.17 | PALE BLUE |
| 9 | DYE 6 | 10 | 0.024 | 0.82 | NONE |
| 10 | DYE 6 | 21 | 0.028 | 1.10 | NONE |
| 11 | DYE 6 | 31 | 0.031 | 1.20 | PALE BLUE |

*where level is the number of millimoles of sensitizing dye added per mole of silver halide and Dmin is the minimum density including base density.

The results in Table 1 show that:

the samples 3 to 11 containing sensitizing dyes according to the present invention have a sensitivity to light of wavelength 670 nm that is higher than that of the comparison dye REF 1 in samples 1 and 2.

additionally, the residual color stain in the samples 6 to 11 according to the invention is substantially lower than in the comparison samples 1 and 2.

TABLE 2

| SAMPLE | DYE | LEVEL* | SP4 | PDP | D SP4 | D PDP |
|---|---|---|---|---|---|---|
| 12 | REF 1 | 18 | 0.63 | 5.09 | −0.19 | −0.97 |
| 13 | REF 1 | 36 | 1.01 | 5.19 | −0.34 | −1.42 |
| 14 | DYE 4 | 10 | 0.48 | 6.08 | 0.00 | −0.95 |
| 15 | DYE 4 | 21 | 0.68 | 5.52 | 0.00 | −0.37 |
| 16 | DYE 4 | 31 | 0.77 | 5.52 | +0.01 | −0.25 |
| 17 | DYE 5 | 11 | 0.69 | 5.15 | −0.04 | −0.40 |
| 18 | DYE 5 | 21 | 0.99 | 5.10 | +0.01 | −0.27 |
| 19 | DYE 5 | 32 | 1.00 | 5.22 | 0.00 | −0.50 |
| 20 | DYE 6 | 10 | 0.65 | 5.28 | −0.08 | −0.67 |
| 21 | DYE 6 | 21 | 0.92 | 5.26 | −0.04 | −0.59 |
| 22 | DYE 6 | 31 | 1.01 | 5.29 | −0.01 | −0.47 |

*where level is the number of millimole of sensitizing dye added per mole of silver halide.

The results in Table 2 show that:

the samples 14 to 22 containing sensitizing dyes according to the present invention show less speed and density changes than the reference dye after accelerated keeping tests.

EXAMPLE 2

The same procedure as Example 1 was followed to evaluate the behaviour of the sensitizing dye DYE 5 (see above for structure) compared to sensitizing dyes REF 1 (see example 1 for structure) and REF 2 (see below for structure), in another chemical environment where the level of bromide ions has been substantially increased. Therefore, a silver halide emulsion with a high sensitivity for short duration exposures was prepared. This emulsion contained 70% silver chloride and 30% silver bromide with an average grain size of 0.18μ.

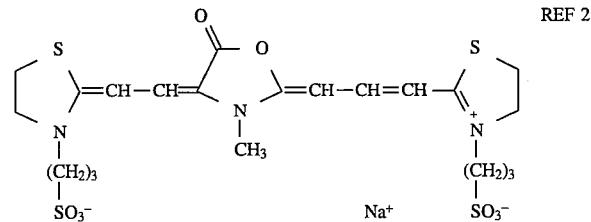

After exposure the sample coatings were processed through a range of developers containing increasing levels of potassium bromide. The developed samples were fixed, washed and dried as in example 1 and the sensitometric curve plotted. The practical maximum density (PDM) is calculated as "the density at (SP0.6+0.2 logE)" and is indicative of the level of nucleation. Table 3 shows the results for the reference dyes, REF 1, REF 2 and the invention dye, DYE 5.

TABLE 2

| DYE | KBr* | PDM |
|---|---|---|
| REF 1 | X1 | 5.49 |
| REF 1 | X2 | 4.00 |
| REF 1 | X3 | 3.32 |
| REF 2 | X1 | 5.40 |
| REF 2 | X2 | 3.19 |
| REF 2 | X3 | 2.30 |
| DYE 5 | X1 | 5.23 |
| DYE 5 | X2 | 4.05 |
| DYE 5 | X3 | 3.44 |

*level of potassium bromide relative to base level of 3.4 g/litre.

The results in Table 3 show that the sensitizing dye DYE 5 according to the invention shows sensitivity to bromide level similar to that of REF 1 and and less than that of REF 2.

The preceding examples are set forth to illustrate specific embodiments of this invention and are not intended to limit the scope of the compositions or materials of the invention. It will be understood that variations and modifications can be effected within the spirit and scope of the invention.

We claim:

1. A photographic element comprising a light sensitive silver halide emulsion sensitized with a dye of formula (I) and a nucleating agent or amine booster associated with the silver halide emulsion:

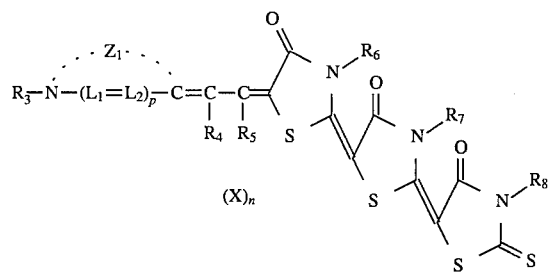

(I)

wherein:

$R_3$ is an alkyl group, alkenyl group, or aryl group $R_4$ and $R_5$ are each hydrogen, an alkyl group, alkenyl or aryl group;

$R_6$, $R_7$ and $R_8$ are, independently, an alkyl group, alkenyl group, aryl group, or H;

the dye has at least three acid or acid salt substituents; and each L independently represents a methine group;

p is 0 or 1;

$Z_1$ represents the atoms necessary to complete a 5- or 6-membered heterocyclic ring group;

$(X)_n$ represents counterions as needed to balance the charge on the molecule.

2. A photographic element according to claim 1 wherein p is 0.

3. A photographic element according to claim 2 wherein $Z_1$ represents the atoms which complete an oxazole group, benzoxazole group, naphthoxazole group, thiazole group, benzthiazole group, naphthothiazole group, imidazole group, benzimidazole group, naphthimidazole group, pyridine group, quinoline group, 1,3,4-thiadiazole group, thiazoline group, selenazole group, benzoselenazole group, naphthoselenazole group, benzotellurazole group, or naphthotellurazole group.

4. A photographic element according to claim 1 wherein the nucleating agent is a hydrazine compound.

5. A photographic element according to claim 1 wherein the silver halide emulsion sensitized by the dye of formula I is located in a layer of the element and the hydrazine nucleating agent and/or amine booster are located in the same layer as the emulsion.

6. A photographic element according to claim 1 wherein at least $R_6$, $R_7$ and $R_8$ have an acid or acid salt substituent.

7. A photographic element according to claim 1 wherein the dye has at least 4 acid or acid salt substituents.

8. A photographic element according to claim 1 wherein all of $R_3$, $R_6$, $R_7$ and $R_8$ have an acid or acid salt substituent.

9. A photographic element according to claim 1 wherein the acid or acid salt substituents are all carboxy or sulfo substituents.

10. A process for forming a high contrast photographic image on a photographic element according to claim 1, comprising imagewise exposing the element to a developing solution.

11. A photographic element comprising a light sensitive silver halide emulsion sensitized with a dye of formula (Ia) and a hydrazine nucleating agent associated with the silver halide emulsion:

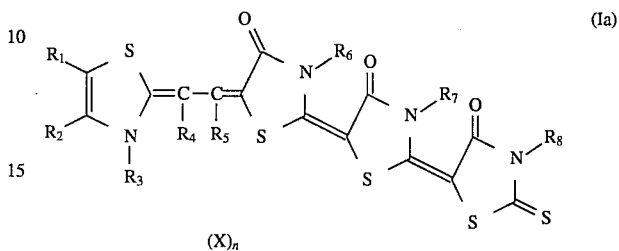

(Ia)

wherein:

wherein $R_1$ and $R_2$ independently represent hydrogen, hydroxy, a halogen atom, an aryl group, a heteroaromatic group, an alkyl group, an alkenyl group, an alkoxy group, an alkylthio group, an arylthio group, an acyl group, an acyloxy group, an alkoxycarbonyl group, an alkylsulfonyl group, a carbamoyl group, a sulfamoyl group, carboxy, or cyano, or $R_1$ and $R_2$ together represent the atoms necessary to complete an annellated benzene, naphthalene, anthracene group or heteroaromatic group;

$R_4$ and $R_5$ are each hydrogen, or an alkyl group;

$R_3$ is an alkyl group;

$R_6$, $R_7$ and $R_8$ are, independently, an alkyl group, at least three of $R_3$, $R_6$, $R_7$ and $R_8$ having an acid or acid salt substituent;

$(X)_n$ represents counterions as needed to balance the charge on the molecule.

12. A photographic element according to claim 11 wherein the hydrazine nucleating agent is of formula (II):

$$R_{15}-NHNH-G_1-R_{21} \qquad (II)$$

wherein: $R_{21}$ is H, an aliphatic group, an alicyclic group, an aromatic group, an alkoxy group, an aryloxy or amino group; $G_1$ represents a —CO— group, a —SO$_2$— group, a —SO— group, a —COCO— group, a thiocarbonyl group, an iminomethylene group or an amino group; and $R_{15}$ is a phenyl group.

13. A photographic element according to claim 12 wherein $R_{15}$ has a Hammett sigma para ("$\sigma_p$") value of less than +0.30.

14. A photographic element according to claim 12 wherein $R_{15}$ has a Hammett $\sigma_p$ value of less than 0.30.

15. A photographic element according to claim 12 wherein $R_{15}$ has a Hammett $\sigma_p$ value of $\leq 0$.

16. A photographic element according to claim 15 wherein the phenyl group is a phenyl substituted with an alkyl group, an alkoxy group, or an acylamino group.

17. A photographic element according to claim 11 wherein the hydrazine compound has a ballast group.

18. A photographic element according to claim 11 wherein the hydrazine compound has a substituent which increases adsorption of the hydrazine compound to the silver halide.

19. A photographic element according to claim 11 wherein the element has an amine booster associated with the silver halide emulsion, which amine booster comprises at least one secondary or tertiary amino group, at least three repeating ethyleneoxy units, and has an n-octanol/water partition coefficient of at least one.

20. A photographic element according to claim 19 wherein the amine booster has an n-octanol/water partition coefficient of at least three.

21. A photographic element according to claim 19 wherein the amine booster is of formula (IIIA) or (IIIB):

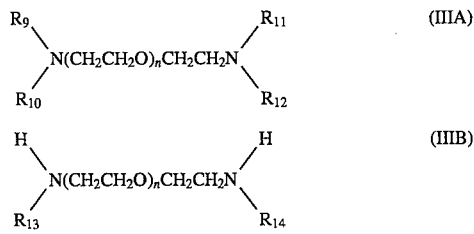

wherein:

n is an integer of 3 to 50;

$R_9$, $R_{10}$, $R_{11}$ and $R_{12}$ are, independently, alkyl groups of 1 to 8 carbon atoms or $R_9$ and $R_{10}$ taken together, and/or $R_{11}$ and $R_{12}$ taken together with the N to which they are appended, may represent the atoms necessary to complete a heterocyclic group; and $R_{13}$ and $R_{14}$ are, independantly, an alkyl group of at least 4 carbon atoms.

22. A photographic element according to claim 11 wherein the element has an amine booster associated with the silver halide emulsion; the amine booster being present in an amount of from 1 to 25 grams per mole of silver halide in the emulsion.

23. A photographic element according to claim 11 wherein $R_1$ and $R_2$ together form an annellated benzene group or naphthalene group.

24. A photographic element according to claim 11 wherein all four of $R_3$, $R_6$, $R_7$ and $R_8$ have an acid or acid salt substituent.

25. A photographic element according to claim 11 wherein $R_3$, $R_6$, $R_7$ and $R_8$ are, independently, a 1 to 5 carbon atom alkyl group; $R_4$ is hydrogen; and $R_5$ is hydrogen or a 1 to 5 carbon unsubstituted alkyl.

26. A photographic element according to claim 11 wherein $R_5$ is hydrogen, methyl or ethyl.

27. A process for forming a high contrast photographic image on a photographic element according to claim 11, comprising imagewise exposing the element to a developing solution.

28. A photographic element comprising a light sensitive silver halide emulsion sensitized with a dye of formula (Ia), and a hydrazine nucleating agent of formula (II) and an amine booster both associated with the silver halide emulsion:

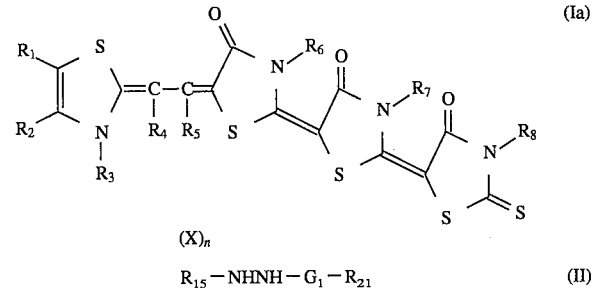

$$R_{15}-NHNH-G_1-R_{21} \quad (II)$$

wherein:

wherein $R_1$ and $R_2$ independently represent hydrogen, hydroxy, a halogen atom, an aryl group, a heteroaromatic group, an alkyl group, an alkenyl group, an alkoxy group, an alkylthio group, an arylthio group, an acyl group, an acyloxy group, an alkoxycarbonyl group, an alkylsulfonyl group, a carbamoyl group, a sulfamoyl group, carboxy, or cyano, or $R_1$ and $R_2$ together represent the atoms necessary to complete an annellated benzene, naphthalene, anthracene group or heteroaromatic group;

$R_4$ and $R_5$ are each hydrogen, or an alkyl group;

$R_3$ is an alkyl group;

$R_6$, $R_7$ and $R_8$ are, independently, an alkyl group, at least three of $R_3$, $R_6$, $R_7$ and $R_8$ having an acid or acid salt substituent;

$(X)_n$ represents counterions as needed to balance the charge on the molecule of formula (I);

$R_{15}$ is a phenyl group and $R_{21}$ may be H, an aliphatic, an alicyclic, an aromatic, an alkoxy, aryloxy or amino group; and $G_1$ represents a —CO—, —SO$_2$—, —SO—, —COCO—, a thiocarbolyl, an iminomethylene or an amino group;

and wherein the amine booster comprises at least one secondary or tertiary amino group, at least three repeating ethyleneoxy units, and has an n-octanol/water partition coefficient of at least one.

29. A photographic element according to claim 28 wherein all of $R_3$, $R_6$, $R_7$ and $R_8$ have an acid or acid salt substituent.

30. A process for forming a high contrast photographic image on a photographic element according to claim 28, comprising imagewise exposing the element to a developing solution.

31. A process for forming a high contrast photographic image on a photographic element having a light sensitive silver halide emulsion sensitized with a dye of formula (I):

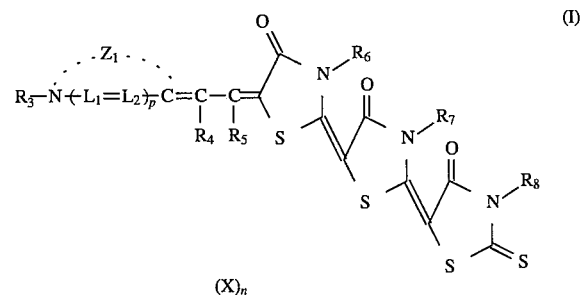

wherein:

$R_3$ is an alkyl group, alkenyl group, or aryl group $R_4$ and $R_5$ are each hydrogen, an alkyl group, alkenyl or aryl group;

$R_6$, $R_7$ and $R_8$ are, independently, an alkyl group, alkenyl group, aryl group, or H;

the dye has at least three acid or acid salt substituents; and each L independently represents a methine group;

p is 0 or 1;

$Z_1$ represents the atoms necessary to complete a 5- or 6-membered heterocyclic ring group;

$(X)_n$ represents counterions as needed to balance the charge on the molecule;

the process comprising imagewise exposing the photographic element and developing the exposed photographic element in the presence of a hydrazine compound and an amine booster.

32. The process according to claim 31 wherein the amine booster comprises at least one secondary or tertiary amino group, at least three repeating ethyleneoxy units, and has an n-octanol/water partition coefficient of at least one.

33. The process according to claim 31 wherein the hydrazine compound and amine booster are located in the photographic element in association with the silver halide emulsion sensitized with the dye of formula (I).

* * * * *